United States Patent [19]

Dougherty

[11] Patent Number: 4,488,921

[45] Date of Patent: Dec. 18, 1984

[54] METHOD FOR FABRICATING LONG LENGTH HOSE UTILIZING AN INTERNAL MOVING MANDREL

[75] Inventor: Robert C. Dougherty, Tucson, Ariz.

[73] Assignee: Durodyne, Inc., Tucson, Ariz.

[21] Appl. No.: 421,914

[22] Filed: Sep. 23, 1982

[51] Int. Cl.³ ................................................. B31C 3/16
[52] U.S. Cl. .................................... 156/172; 156/173; 156/432
[58] Field of Search .............. 156/149, 169, 172, 195, 156/244.13, 190, 143, 425, 428, 430, 431, 432, 173, 175; 264/173, 166, 277, 278, 516

[56] References Cited

U.S. PATENT DOCUMENTS

| | | | |
|---|---|---|---|
| 2,760,549 | 8/1956 | Nash et al. | 156/149 |
| 3,038,523 | 6/1962 | Merck et al. | 156/149 |
| 3,888,714 | 6/1975 | Fiser et al. | 156/162 |
| 4,010,054 | 3/1977 | Bradt | 156/173 |
| 4,099,425 | 7/1978 | Moore | 156/149 |
| 4,309,232 | 1/1982 | McIntosh | 156/195 |

Primary Examiner—Jay H. Woo
Assistant Examiner—Timothy W. Heitbrink
Attorney, Agent, or Firm—J. Michael McClanahan

[57] ABSTRACT

A method is described for fabricating long length hose around an internal moving mandrel comprising the steps of forming an inner tube of an elastomeric or thermoplastic material, curing said inner tube, inserting a lubricated mandrel interiorly a portion of said cured tube, applying a first layer of uncured elastomer or thermoplastic tie gum to said cured tube surrounding said mandrel, encircling the layer of uncured tie gum with a reinforcing material under tension, adding multiple layers of uncured elastomer or thermoplastic tie gum and encircling reinforcing material as necessary for the hose strength required, placing an uncured elastomer or thermoplastic tie gum final layer on said reinforcing material, adding an uncured hose covering material layer on top of said tie gum final layer, wrapping under tension a strengthening material onto the hose covering material for consolidation and protection of the hose during vulcanization, moving the mandrel from the portion of the complete hose to the adjacent portion of the uncompleted hose, repeating the steps of fabricating a length of hose around the mandrel, and repeating the step of moving the mandrel to the next uncompleted portion of the hose until the full length of the inner tube has received all the fabrication materials, then moving the mandrel out of the hose, vulcanizing the uncured hose to cure the hose, and removing the consolidation wrapping from the completed hose.

8 Claims, 4 Drawing Figures

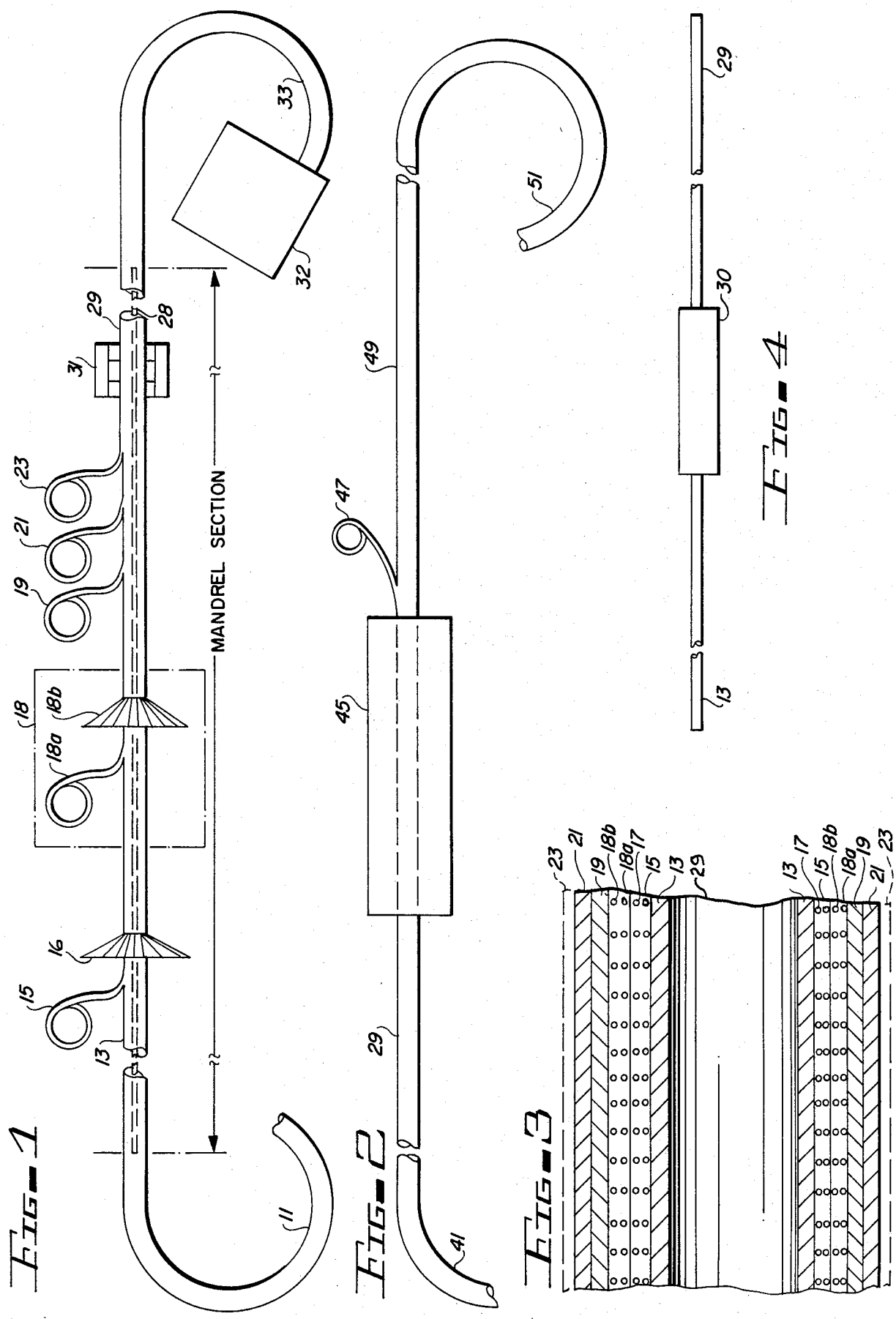

METHOD FOR FABRICATING LONG LENGTH HOSE UTILIZING AN INTERNAL MOVING MANDREL

BACKGROUND OF THE INVENTION

Hose can best be described as a flexible pipe. Its purpose is to contain and transmit fluid from one location to another safely. Fluids include liquid, gas, solids in a fluidic state and combinations of these categories. Hose has advantages over pipe inasmuch as it is flexible, it absorbs vibration, it may handle corrosive fluids, it comes in a great variety of sizes, it is sound dampening, and is easily stored.

Hose is constructed of three basic elements, (1) the tube or inner liner which is the element which contains, conveys and resists the fluid inside. It transmits the forces created by internal pressure of the fluid to the strength member of the hose; (2) the reinforcement or strength member of the hose, commonly referred to as "hose reinforcement", reacts to and resists the forces of the fluid pressure; and (3) the cover which protects the hose reinforcement from physical damage and resists the external environment.

Materials used to construct the tube or inner liner and the cover consists of, in the most common cases, rubber or plastic, while the hose reinforcement usually comprises yarns, fabrics, and metal in the form of filaments, wires, fabric, braid, spirals, etc. Rubber is used in its broad sense including all elastomeric materials—natural, synthetic, and compounds and structures thereof, while plastics include the wide spectrum of thermoplastic materials. The hose reinforcement includes materials made from cotton, synthetics, or combinations thereof, and metals include steel, copper, aluminum, and platings thereon such as zinc, brass, cadmium, and tin.

Available today are a wide range of basic elastomers to choose from, and many types can be blended together in almost unlimited combinations to obtain different properties. Common rubbers available are neoprene, natural rubber, polyisoprene, butyl, nitrile, SBR, hypalon, ethylene, propylene, chloronated polyethylene (CPE), fluorocarbons, epichlorohydrin, and epichlorohydrin/ethylene oxide. Examples of thermoplastic materials include polyvinyl chloride (PVC), polyethylene (PE), nylon, polyester, polyurethane (TPU), and EVA. In addition, fibers commonly used in hose construction comprise cotton, rayon, glass, nylon, polyester, asbestos, fiber B, and nomex nylon.

The five basic types of hose reinforcements are identified by the method of manufacture or application over the inner tube or liner. These five types are braid, spiral, wrapped ply, loom, and knit. In braiding, a braid is formed by interweaving cords while they are being applied in a helical spiral over the tube. One-half of the cords are spiraled right-hand, and the other left-hand. The most common hose braiding machines weave cords in a two-over, two-under pattern. When multiple plies are braided, it is important to obtain proper adhesion between plies as well as to the tube and cover. Adhesion is usually obtained by the use of a thin layer of tie gum, often called friction, or by a dough or cement application in and around cores of the braid.

Spiral reinforcement is applied in separate plies. The first ply is laid in a left-hand spiral and the second ply is laid in a right-hand spiral. Successive plies are applied in a similar manner, each ply separated by a tie gum layer or dough adhesive. Wrapped ply reinforcement of a woven fabric is often used as hose reinforcement, either as a series of multiple plies, or in conjunction with a spiral wire. The fabric is prepared by calendering or coating the fabric with rubber compound, i.e., tie gum, which enables the fabric to adhere to adjacent plies, to the tube, and to the cover. In addition, the tie gum may first be applied to the tube and then wrapped with the woven fabric. Loom reinforcement of hose is made with cords wound at a closed circular pitch while longitudinal (wrap) yarns are interwoven with the circular wound cords. Knit reinforcement of hose is accomplished by applying reinforcing yarns over the tube in a circular knitting machine. Variations of the knit pattern include a plain knit, lock-stitch, or wrap knit.

For more extensive information, the reader is referred to the publication, HOSE HANDBOOK, Rubber Manufacturers Association, 1901 Pennsylvania Avenue, N.W., Washington, D.C. 20026 (1979).

The inner tube or liner must be firm enough in the unvulcanized state to resist deformation and stretch under normal processing conditions described above. When the tube is too thin or too soft to withstand subsequent processing, or when the internal diameter must be kept within a narrow range, it is supported on a mandrel. The mandrel is at least as long as the hose to be made and has a round or other cross-section as desired.

In many cases, hoses utilized for pressurized liquids are wrapped with hose reinforcement applied under tension and the material chosen for the inner tube is not sufficiently firm to resist deformation and stretch and therefore must be vulcanized prior to application of the tie gum and hose reinforcement. In addition, many times the inner tube must be supported on an internal mandrel during this method of processing. The present state of the art in constructing hose for pressurized liquids is to employ a mandrel at least as long as the hose to be made, the mandrel being removed either before or after vulcanization of the tie gum and hose cover. If the mandrel is removed prior to final vulcanization, the interior of the hose is supported during vulcanization by gas under pressure.

Because of the problems that are inherent in removing the mandrel from a completed hose (before or after final vulcanization), hose length has been limited in construction to lengths which can be physically handled during processing and where the mandrel can be removed without substantial danger of harming the hose.

As a consequence, when long lengths of hose are desired, it is necessary to join pieces of hose to achieve the long lengths. This results in discontinuities of all the members of the hose at the point of joinder. In addition, it is common for hose normally flexible to be more rigid at the points of joinder, whether the joinder be by method of metal coupling, or through build-up of additional material holding both ends of the hose together.

It is to this end that the subject inventive method is directed, i.e., to present a method of fabricating virtually unlimited length hose having no discontinuities therein.

SUMMARY OF THE INVENTION

The present invention provides a method by which heretofore unproducible single section long length hoses may be constructed. Applicant's method comprises the steps of firstly extruding or laying up the inner tube or lining for the resultant hose, curing or vulcanizing the inner tube as needed, inserting a lubricated mandrel into a portion of the inner tube interior to support the inner tube during processing, placing uncured tie gum on the inner tube portion containing the mandrel, placing hose reinforcement upon the layer of tie gum, adding additional tie gum and hose reinforcement layers as required, placing a final layer of uncured tie gum upon the hose reinforcement, adding the uncured hose cover upon the final layer of tie gum, and wrapping the hose with a layer of strengthening material for consolidation during final vulcanization. When that portion of the hose encompassing the mandrel has been covered with the first layer of tie gum, the reinforcement material, any multiple layers of uncured tie gum and reinforcement material, the final layer of tie gum, the hose cover, and the consolidation wrapping, the lubricated mandrel is moved further into the cured inner tube past the completed portion of the hose to the uncompleted portion and then the steps above repeated. After the complete uncured hose has been constructed, the mandrel is removed from the hose, the hose placed under internal pressure to inflate it against the consolidation wrapping, and then the hose is vulcanized. After the hose has been vulcanized, the consolidation wrapping is removed and the hose is completed.

It is an object of the subject invention to provide a method of constructing hoses of long lengths which heretofore were not possible.

It is another object of the subject invention to construct hoses of long length utilizing the method of moving the mandrel in the hose as it is being constructed.

Other objects of the invention will in part be obvious and will in part appear hereinafter. The invention accordingly comprises the method of construction combining the elements and arranging the parts which are exemplified in the following details disclosure and the scope of the Application of which will be indicated in the claims.

BRIEF DESCRIPTION OF THE DRAWINGS

For further understanding of the nature and objects of the present invention, reference should be had to the following detailed description taken in connection with the accompanying drawings wherein:

FIG. 1 is a block schematic diagram of the subject inventive method constructing long length single section hoses;

FIG. 2 is a block schematic diagram of the last step vulcanizing the completed hose;

FIG. 3 is a cross-sectional view of the completed uncured hose taken along the hose longitudinal axis; and FIG. 4 is an alternate embodiment showing the hose fabricated along one straight line.

In the various views, like index numbers refer to like elements.

DETAILED DESCRIPTION OF THE PREFERRED PROCESS

Reference is now made to FIG. 1 showing in schematic form the apparatus for utilizing Applicant's method of fabricating long lengths of hose utilizing an internal moving mandrel. Detailed in FIG. 1 is the apparatus for accomplishing each of the steps of Applicant's process comprising and starting from left to right, the cured tube 13 which is the inner tube or liner portion of what will become the completed long length hose. This cured tube is made of an elastomer or thermoplastic suitable for the eventual use of the hose, for example, it may be made of butyl rubber if it is to be used as an air hose; epichlorohydrin for use in transporting jet fuel; or acrylonitrile for use in transporting gasoline. This tube may be extruded as a cylinder or laid up, i.e., wrapped around a metal mandrel of the full length, in which case there will be a lengthwise seam. The tube is cured by the particular vulcanization process which is appropriate for the particular type of elastomer used. Examples of the more commonly known methods of the vulcanization process are curing with heat, such as steam or hot air, or such other methods as heating with microwaves or dipping the tube in a hot molten salt.

The cured tube utilized in Applicant's method of fabricating long length hose is, in its preferred state, one piece for the full length of the final product.

While it is noted that Applicant has given examples of certain types of material to be used as the cured inner tube, it should be realized that the preparation of this cured tube is well known in the art. Since Applicant, in his described process, will also be vulcanizing the resultant hose by appropriate process, it is noted that such process will be redundant for the inner cured tube. The inner tube is cured in the example given because the materials which are in most common use today do not have sufficient strength, without curing, to withstand the other steps in the process later described. It is possible, with appropriate elastomers and thermoplastics, to omit the step of curing if the tube has sufficiently integrity. An example of these hose materials which may be used are thermoplastic such as nylon or cross-linked polimers such as polyethylene, which do have sufficient integrity after forming the tube to withstand the stress applied by Applicant's method without being first strengthened through curing.

Referring again to FIG. 1, the coil 11 of cured tube 13 (if the cured tube is susceptible to being coiled) is initially uncoiled to whatever length is necessary to reach the hose traction mechanism 31. This length will be greater than the length of the mandrel. Traction mechanism 31, as signified by its name, is a means by which the hose is grasped about its circumference, and which proceeds to pull the hose through the other processes hereinafter described. Pulling of the hose is resisted by the apparatus applying hose reinforcement and the consolidation wrapping, also hereinafter described. It will be noted that by the time the cured tube reaches traction mechanism 31, other processes have been applied to the cured tube and it may now be classified as an uncured hose.

In the Applicant's preferred method of fabricating the hose, the traction mechanism 31 comprises two endless driven belts situated on opposite sides of the uncured hose 29, which belts are urged against the hose to pull the uncured hose 29 along to allow the prior processes to be applied.

At the outset, in setting up Applicant's process, a mandrel must be inserted interiorly to the cured tube 13 as the cured tube is pulled along the take-off table, usually a line of rollers or other means holding the cured tube in place, to the point where it is engaged by traction mechanism 31.

The mandrel in the preferred application consists of an elongated metal closed end cylinder which may take a round or other cross-sectional shape, depending upon the desired resultant hose configuration, and which has a rounded or tapered front end. This mandrel may be of any length sufficiently long so that it be interior to cured tube 13 during the processes which are later described. In the preferred method, Applicant has chosen to bunch the apparatus which will be utilizing Applicant's method to a space of about 30 feet. The mandrel chosen had a length of about 150 feet which allows approximately 100 to 120 feet of cured tube to be worked before it was necessary to advance the mandrel to a new unworked section. The mandrel 28 interiorly to cured tube 13 about which the hose is constructed is shown in dotted fashion in FIG. 1.

To insert the mandrel into the cured tube, it is usually necessary to apply a lubricant into the open end of the cured tube and to the sides of the mandrel as it is introduced into the cured tube 13. Lubricants for inserting the mandrel into the cured tube are well known and widely available, one of the most common being liquid soap or a mixture of soap and water. In addition, the mandrel may be self-lubricating, i.e., it may be covered with a permanent slippery substance such as teflon plastic. With such a self-lubricated mandrel, little or no additional lubricant may be necessary.

The mandrel is inserted into the cured tube by holding the sides of the tube and mechanically pushing the mandrel into the tube. Since the mandrel is chosen to be slightly smaller than the tube, this is not a particularily difficult step. The lubricant already in the tube will be pushed forward of the mandrel with some leakage around the mandrel joining with the lubricant that had been additionally applied to the mandrel circumference as it enters the tube.

The mandrel is fully inserted into the tube and the combined tube and mandrel is placed in position so that the end of the cured tube 13 with mandrel interiorly is engaged by the traction mechanism 31. In Applicant's usage of his method, a long assembly take-off is utilized complete with pairs of rollers on either side forming a shallow "V". The assembly line extends on either side of the process apparatus a distance equal to at least the length of the mandrel. This is shown in FIG. 1 as the "mandrel section" which, if a mandrel of 150 feet was utilized, should be no less than 270 feet, allowing a distance of 30 feet for the process apparatus. Of course, the "mandrel section" shown in FIG. 1 could be greater than the total length of the resultant hose in which case the hose would not be coiled at either end or, more commonly, it is coiled at its beginning end, and straight for the remaining section.

After the cured tube is placed on the take-off table on which it resides for the processes, the first step is to place a layer of tie gum 15 upon cured tube 13. This tie gum, which like the tube material, is an elastomer or thermoplastic such as butyl rubber, neoprene, or chloroprene, and is available in suitable widths, most usually 4 to 6 inches. The uncured tie gum 15 may be applied to cured tube 13 by spiral winding in which case the roll of tie gum would be circulated around the outside of cured tube 13 or cured tube 13 itself could be rotated, or the tie gum 15 may be added by an elongated covering wrap wherein a lengthwise seam would be present.

The purpose of the uncured tie gum is to increase the adhesion between the cured tube 13, the reinforcing material which is next added, and the remainder of the hose body, which may be another tie gum layer or the hose covering.

It is noted that if an uncured tube of certain materials having high green (uncured) strength and adequate adhesive qualities were utilized rather than cured tube 13, the step adding the uncured tie gum 15 may be obviated since the uncured tube itself would provide the needed adhesion.

It is further noted that even if the cured tube 13 were of a material which, even after curing, did have sufficient adhesion, the step adding the cured tie gum might also be obviated. This would be possible if a urethane tube material were utilized.

After the uncured tie gum 15 is placed on cured tube 13, the hose reinforcement material previously mentioned is now applied through the use of apparatus 16. Apparatus 16 may be a braider, a loom, or any other available device whose purpose is to apply to the cured tube 13 with the added tie gum a reinforcing material. The reinforcing material may be a cloth braid, steel, copper, or other metal wires, nylon string, or any other material which is wound around the cured tube 13 in a circular or spiral fashion and which embeds itself in the uncured, soft, tie gum 15. If a braider is employed, such as Applicant commonly utilizes in his method, it may consist of as many as 64 groups of individual strands of fiber material which are woven around the tube in a cross-hatching pattern. Of course any desired pattern of material may be utilized, as well as any type of reinforcing material. The whole purpose of apparatus 16 is to apply a hose reinforcing material which resists the pressure of the liquid in the finished hose pushing outward. It is common for each of these strands of reinforcing material to be under a tension of 5 to 30 pounds so that a tight resisting force may oppose any liquid pressure. Obviously the traction mechanism 31 pulling against the braids or other wrapping device must be greater than the sum of the horizontal component of each applied hose reinforcing material strand.

Following the first application of tie gum layer 15 and reinforcing material 17 (FIG. 3), block 18 shown in dotted form containing tie gum 18a and reinforcing material 18b illustrate optional layers of tie gum and reinforcing material which may be added to the hose following the first layers of tie gum 15 and reinforcing material 17 as may be necessary to impart the necessary strength and integrity to the hose to make it suitable for its planned use.

Continuing on, following the optional multiple layers added by the apparatus in block 18, the next step of adding a second layer of uncured tie gum 19 is an optional step. The tie gum is added after the previous reinforcing material if additional adhesion is needed for the upcoming later steps. In addition, when the hose is to be constructed of an outer covering material which is different than the inner cured tube 13, or where the outer covering material is not compatible with any tie gums which it may come into contact, a transition uncured tie gum 19 compatible with such prior tie gum and with the outer covering may be required.

After applying or not applying the tie gum layer 19 as needed, the next step is to add the resultant hose cover which comprises, in most cases, an elastomer selected to meet the requirements for the environment in which the hose will be placed. In many cases, the hose cover 21 is the same elastomer or thermoplastic material as is the cured tube 13. Hose cover 21 may be applied by a spiral wrap, or it may be laid up in a long sheet wrapped around the cured tube 13 with a lengthwise seam.

All seams formed in the hose materials, i.e., the inner tube 13, tie gum layers 15 and 19, and hose cover 21 will bond together during the final vulcanization curing process.

Following the application of hose cover 21, the hose is now wrapped with a strong wrapping material 23 which serves to consolidate and protect the hose during the final curing vulcanization process. The wrapping 23 is most commonly applied in a spiral wrap to hose 29 and is placed under a tensile load of up to 100 pounds, the load dependent upon the type of material the hose is constructed, and the purpose to which the hose will eventually be put. In the preferred process utilized by Applicant, a synthetic fiber wrap, such as nylon, is utilized for wrapping material 23, the nylon having a width of approximately 3 inches allowing two to three overlaps in the spiral wrap.

It is realized that the consolidation wrapping may be omitted for hoses fabricated where the hose materials utilized are sufficiently strong enough to withstand the vulcanization process without distention.

Still referring to FIG. 1, the description of the process has now reached the step utilizing the traction mechanism 31 which grasps the sides of the hose with the mandrel interior, pulling the hose and mandrel in the direction from left to right and thereby advancing through the processes described above. As earlier stated, resisting the pull exerted by the traction mechanism 31 are the strands of reinforcing material and the horizontal component of the tension applied to wrapping material 23, as well as the normal friction exerted by the weight of the cured tube 13 upon the take-off table.

The completed uncured hose 29, as it emerges from traction mechanism 31, is coiled, left in a straight line, or otherwise contained awaiting the next step.

The processes above described through the addition of the wrapping 23 is accomplished with the mandrel inside cured tube 13 and moving along with the cured tube 13 through the various stages until that portion of the hose containing the mandrel has moved or advanced through the various processes. At this point, the end of the mandrel is beginning to approach the point where the first process is initiated, i.e., the application of the first uncured tie gum layer 15. At this point the operation is stopped while the mandrel is now moved to the opposite end, i.e., more interiorly into the cured tube 13 and towards the coil 11 of the cured tube in order that the process may be repeated.

To this end, and while maintaining tension on the completed hose section, i.e., between reinforcing material applying apparatus 16, any subequent reinforcement material applying apparatus, and consolidation wrapping 23, and the traction mechanism 31, the completed, but uncured hose 29, forward of the end of the mandrel, is injected under pressure with a lubricant such as a water and air mixture, soap mixture, or any other type of commonly available lubricant. Means sealing the end of completed hose 29 but allowing entrance into the open end for insertion of lubricant and injection of a fluid (gas, liquid, or combination) under pressure is shown by block 32. While beginning to release the sides of the traction mechanism 31, the hose forward of the forward end of the mandrel is secured so as not to lose the tension in the hose. While holding the end of the uncured hose 29, the pressure injecting the lubricant is gradually increased, causing the hose 29 to inflate and causing lubricant to flow around the mandrel between the sides of the hose. As the pressure is increased, with the cured tube 13 lying in a straight line, the mandrel then will begin to be pushed rearward, the mandrel already previously lubricated from original insertion and lubricant still remaining ahead of the mandrel in the interior of the cured tube 13 placed in the initial step of inserting the mandrel into the tube. In the case that it should be discovered that insufficient lubricant does reside ahead of the mandrel in the cured tube 13, it is always possible to inject new and additional lubricant into cured tube 13 from the rear, unfabricated portion of the tube.

The mandrel is thus moved by the lubricant under pressure in hose 29. As the mandrel does slide, the lubricant pressure in uncured hose 29 will begin to fall and progress of the mandrel may be carefully monitored. In addition, because in many cases the cured tube 13 is very flexible, the passage of the mandrel into new sections can be visually observed.

The mandrel is moved until its rearward end just resides immediately forward of the traction mechanism 31, at which point the movement is terminated, and traction mechanism 31 is once more set to engage the sides of the uncured hose 29 with the mandrel inside. The pressure of the added lubricant is then released as well as releasing the grasp of the hose 29 ahead of the mandrel which kept it in tension while the mandrel was moved.

The above described operation is repeated until the total length of the cured tube 13 has passed all the operations and a final uncured hose 29 is constructed, having at that time consolidation wrapper 23 on its outside.

The above described method is not to preclude a continuously moving mandrel, i.e., the mandrel moving in the cured inner tube at the same rate as the hose being fabricated is moved by the traction mechanism 31, but in the opposite direction. In the present state of the art, this is accomplished when the tension placed upon the brading machine's reinforcing material is of a sufficiently small value that the friction between the inner tube and mandrel together with friction added by traction mechanism 31 is not prohibitive to continuous movement of the mandrel. A steady positive pressure upon the forward end of the mandrel will move it to the rear at a measured rate. In addition to residual fraction between the completed hose and mandrel, the only points of additional friction will be at the traction mechanism 31 and reinforcing material applying apparatus 16.

The last and final step in the fabricating of the long length hose is accomplished by vulcanization of the hose and removal of consolidation wrapper 23. This may be accomplished as set out in schematic diagram fashion in FIG. 2.

Referring now to FIG. 2, the coil 41 of uncured wrapped hose is shown in the position for the vulcanization or curing process. The uncured hose may, if desired, not be coiled but be in a straight line if sufficient length of take-off table is available. Coming off the coil 41 of the uncured wrapped hose is the hose 29 immediately prior to entering the vulcanization chamber 45. Before the uncured hose 29 enters the vulcanization chamber 45, both ends of the hose are sealed and air or liquid placed interiorly the hose under paressure which remains during the period of time that the vulcanization is taking place. In the vulcanization chamber, the hose 29 with its exterior consolidation wrapping 23 is vulcanized by any one of the known processes applying heat to the external, internal, or both surfaces of the hose, such as steam, hot air, hot liquid, microwaves, or any other process known in the art. Note that the entire length of uncured hose may be ucred at one time if: (a)

there is a long enough vulcanizer available, (b) steam or heated fluid is circulated through the hose, (c) exterior heat is applied while interior pressure maintains the hose integrity, or (d) a combination of these and/or other curing methods are used.

After vulcanization on the section within the vulcanization chamber 45, the cured hose is pulled through the chamber where the wrapping material previously applied is removed from the cured hose onto a roller 47. The finished product or completed hose is shown by numeral 49. The finished hose is then placed into a coil as illustrated by the number 51.

Referring now to FIG. 3, a cross-sectional view of the uncured hose 29 taken longitudinally to the axis of the hose is detailed. Starting from the inside, cured tube 13 comprises the center-most portion of the hose, cured tube 13 is to be that portion in direct contact with the fluid which is to be conveyed by the hose. Following the cured tube 13 is the first layer of tie gum 15 with the reinforcing material 17 interspersed in the tie gum. The reinforcing material 17 was wrapped under tension over the tie gum, and by the fact of the pressure of the reinforcing material, and the plasticity of the tie gum, the tie gum will work its way up through and around the reinforcing material as shown in the drawing. Following the layer of tie gum 15 and reinforcing material 17 is one of the plurality of tie gum 18a and reinforcing layer 18b added as necessary for hose integrity, and as was applied by the apparatus shown in block 18 of FIG. 1. Following the layer or layers of tie gum and reinforcing material placed on the tube by the apparatus of block 18 in FIG. 1 is the transition final layer 19 of tie gum followed by the outside cover 21. Shown in dotted form is the wrapping material 23 serving to consolidate the layers of the hose until the hose has been vulcanized at which time the consolidation wrapping 23 is removed.

As indicated earlier in this specification, any number of tie gum layers and reinforcing layers, such as layers 15 and 17, and layers 18a and 18b in the FIG. 3, may be utilized. The number of layers is primarily determined by the expected use to which the hose will be put. Of course, a high pressure hose will require more reinforcing material and tie gum layers than a hose that is not to be used under high pressure. Similarily, if the hose is to be subjected to abrasive or abusive use, multiple layers of tie gum and reinforcing materials will be needed. It should be realized that the more layers incorporated in the hose will also result in less flexibility of the hose.

Referring now to FIG. 4, an alternate embodiment is shown where the hose has been laid out straight in its complete length upon a set-up table where it may be processed in a straight line. In FIG. 4, the cured tube 13 is shown in the left side of the figure and the completed uncured hose 29, ready for vulcanization, is shown in the right hand side of the figure, with block 30 representing the fabrication operations performed upon the cured tube 13 which result in the complete uncured hose 29. The elements which reside in the block 30 are the apparatus for fabricating hose as shown in FIG. 1.

The mandrel section through which the mandrel is or may be interiorly to the cured tube 13 and to uncured hose 29 is the total length of the hose and tube shown in FIG. 4.

While a preferred method of fabricating long lengths of hose has been shown and described, it will be appreciated that there is no intent to limit the invention by such disclosure, but rather it is intended to cover all modifications and alternate steps falling within the spirit and the scope of the invention as defined in the appended claims.

I claim:

1. A method of intermittently fabricating long lengths of hose composed of an inner tube, at least a first layer of tie gum material, at least a first layer of reinforcing material, and hose covering material comprising the steps of:
    forming an inner tube of hose material of a desired length;
    inserting a mandrel substantially shorter than said inner tube into said inner tube so that the entire mandrel is covered by a portion of said inner tube;
    advancing said inner tube and said mandrel while applying a first layer of tie gum material upon the portion of said inner tube covering the mandrel;
    advancing said inner tube and said mandrel along with said tie gum material layer while encircling said first layer of tie gum material with a first layer of reinforcing material;
    continuing to advance said inner tube and said mandrel along with said first tie gum material layer and said first layer of reinforcing material and further adding a hose covering material on said layer of reinforcing material to complete the hose fabrication upon the portion of said inner tube covering the mandrel;
    moving the mandrel from the portion of the fabricated hose to the next adjacent portion of the inner tube while said portion of fabricated hose is held stationary;
    repeating the steps of fabricating the hose upon the inner tube immediately surrounding the mandrel;
    repeating the steps of moving the mandrel to the next portion of the inner tube and fabricating the hose upon the inner tube immediately surrounding the mandrel until the full length of the inner tube has received all the fabrication materials;
    moving the mandrel out of the hose; and
    vulcanizing the hose to cure the hose.

2. The method of fabricating long lengths of hose as defined in claim 1 further including the following step after forming the inner tube of hose material:
    providing lubrication interiorly to the inner tube.

3. The method of fabricating long lengths of hose as defined in claim 2 wherein prior to inserting a mandrel interiorly the inner tube, an additional step is added comprising:
    lubricating the mandrel.

4. A method of fabricating long lengths of hose as defined in claim 3 wherein the step of moving the mandrel from the portion of the completed hose to the next adjacent portion of the inner tube includes the step of:
    pushing the mandrel forward into the uncompleted hose.

5. The method of fabricating long lengths of hose as defined in claim 4 wherein the step of pushing the mandrel forward includes the step of:
    applying pressure against the end of the mandrel to push the mandrel forward.

6. The method for fabricating long lengths of hose as defined in claim 5 further comprising the steps of:
    applying alternate multiple layers of tie gum materials with alternate multiple layers of encircling reinforcing materials upon said first layer of reinforcing materials;

placing a final layer of tie gum material upon the last layer of reinforcing material prior to adding the hose covering material;

wrapping under tension the strengthening material onto the hose covering material for consolidation and protection of the hose during vulcanization; and removing the consolidation wrapping from the cured hose after vulcanization.

7. The method of fabricating long lengths of hose as defined in claim 1 wherein the step of inserting a mandrel interiorly the inner tube comprises the step of:

inserting a self-lubricating mandrel interiorly the inner tube.

8. A method of fabricating long lengths of hose comprising the steps of:

forming an inner tube of hose material of the desired length;

inserting a mandrel of a length substantially shorter than the inner tube interiorly the inner tube;

continually moving the mandrel through the inner tube while;

fabricating the hose or hose material upon the inner tube immediately surrounding the moving mandrel; then moving the mandrel out of the completed hose; and vulcanizing the hose to cure the hose.

* * * * *